(12) United States Patent
Schmidt-Freytag et al.

(10) Patent No.: US 8,946,323 B2
(45) Date of Patent: Feb. 3, 2015

(54) ANIONIC WETTING AGENTS FOR STABILIZING SELF-DEPOSITING COMPOSITIONS COMPRISING OXIDIC PIGMENTS

(75) Inventors: Ulrike Schmidt-Freytag, Duesseldorf (DE); Ute Herrmann, Wuppertal (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 46 days.

(21) Appl. No.: 13/292,332

(22) Filed: Nov. 9, 2011

(65) Prior Publication Data

US 2012/0156386 A1 Jun. 21, 2012

Related U.S. Application Data

(63) Continuation of application No. PCT/EP2010/055661, filed on Apr. 28, 2010.

(30) Foreign Application Priority Data

May 13, 2009 (DE) .......................... 10 2009 003 082

(51) Int. Cl.
| | | |
|---|---|---|
| *C09D 163/00* | (2006.01) | |
| *C09D 5/00* | (2006.01) | |
| *C09D 133/08* | (2006.01) | |
| *C09D 161/06* | (2006.01) | |
| *C09D 175/04* | (2006.01) | |
| *B05D 7/14* | (2006.01) | |
| *C09D 5/08* | (2006.01) | |
| *B32B 15/082* | (2006.01) | |
| *B32B 15/092* | (2006.01) | |
| *B32B 15/095* | (2006.01) | |
| *B32B 15/098* | (2006.01) | |

(52) U.S. Cl.
CPC ............... *C09D 5/088* (2013.01); *B05D 7/142* (2013.01)
USPC ..................... 523/458; 106/14.11; 106/14.21; 106/14.41; 106/14.43; 106/14.44; 523/402; 523/412; 523/457

(58) Field of Classification Search
USPC .......... 106/14.05, 14.11, 14.21, 14.41, 14.43, 106/14.44; 523/400, 402, 406, 409, 412, 523/457, 458
See application file for complete search history.

(56) References Cited

U.S. PATENT DOCUMENTS

| | | | |
|---|---|---|---|
| 3,592,699 | A | 7/1971 | Steinbrecher et al. |
| 3,825,438 | A | 7/1974 | Pritchard et al. |
| 4,108,817 | A | 8/1978 | Lochel, Jr. |
| 4,177,180 | A | 12/1979 | Hall |
| 4,178,400 | A | 12/1979 | Lochel, Jr. |
| 4,180,603 | A | 12/1979 | Howell, Jr. |
| 4,242,379 | A | 12/1980 | Hall et al. |
| 4,243,704 | A | 1/1981 | Hall et al. |
| 4,289,826 | A | 9/1981 | Howell, Jr. |
| 5,342,694 | A | 8/1994 | Ahmed et al. |
| 5,412,019 | A | 5/1995 | Roulstone et al. |
| 5,500,460 | A | 3/1996 | Ahmed et al. |
| 5,760,112 | A | 6/1998 | Hirota et al. |
| 5,824,424 | A | 10/1998 | Haneishi et al. |
| 6,096,806 | A | 8/2000 | Mueller et al. |
| 6,559,204 | B1 | 5/2003 | Agarwal |
| 6,596,071 | B2 | 7/2003 | Hayashi et al. |
| 6,645,633 | B2 | 11/2003 | Weller et al. |
| 7,037,385 | B2 | 5/2006 | Kucera et al. |
| 7,138,444 | B2 | 11/2006 | McGee et al. |
| 2002/0011309 | A1 | 1/2002 | Agarwal et al. |
| 2003/0212181 | A1* | 11/2003 | Honda et al. .................. 524/438 |
| 2005/0065242 | A1* | 3/2005 | McGee et al. ................ 523/402 |
| 2005/0252782 | A9 | 11/2005 | Williams et al. |
| 2006/0162820 | A1 | 7/2006 | Dietsche et al. |
| 2008/0069960 | A1 | 3/2008 | Abu-Shanab et al. |

FOREIGN PATENT DOCUMENTS

| | | |
|---|---|---|
| EP | 01270686 A2 | 1/2003 |
| JP | 2003128876 A | 5/2003 |
| JP | 2004018311 A | 1/2004 |
| JP | 2006131715 A | 5/2006 |
| WO | WO9105023 | 4/1991 |
| WO | 0017269 A1 | 3/2000 |
| WO | 0043131 A2 | 7/2000 |

OTHER PUBLICATIONS

International Search Report for PCT/EP2010/044661, dated Jul. 1, 2010, 3 pages.
Bestimmung der Mahlfeinheit (Koernigkeit); (ISO 1524:1983) Deutsche Fassung EN 21 524:1991, 10 pages.
International Search Report for PCT/US2007/020186, mailed Jan. 25, 2008, 2 pages All references in the International Search Report are listed herein.
Millennium Inorganic Chemicals, "Tiona 595 Slurry".
Millennium Inorganic Chemicals, "Tiona 595".

(Continued)

*Primary Examiner* — Michael J Feely
(74) *Attorney, Agent, or Firm* — Mary K. Cameron

(57) ABSTRACT

The present invention relates to an acidic aqueous particulate composition containing, in addition to iron(III) ions, fluoride ions and at least one water-insoluble, dispersed organic binder, a water-insoluble, dispersed oxide pigment with elevated resistance to agglomeration for the autophoretic deposition of organic-inorganic hybrid layers onto metal surfaces, the composition additionally containing at least one anionic wetting agent which comprises functional groups selected from sulfonates, phosphonates and/or carboxylates. The invention furthermore comprises the use of such a composition for the autodeposition of a film-forming organic-inorganic hybrid coating onto metal surfaces which are at least in part selected from surfaces, the main constituents of which are iron, zinc and/or aluminum.

15 Claims, No Drawings

(56) References Cited

OTHER PUBLICATIONS

Surfactants Derived from Naphthalene, Jiao Xue-shun, China Surfactant Detergent & Cosmetics, 2000, vol. 3, pp. 29-33 (English abstract on last page).

Synthesis, Structure and Hydration of Sodium Dioleyl Sulfosuccinate, Yu Yan-Chun et al., Acta Phys.—Chim.Sin., 2009, 25(1), pp. 31-34 (with English abstract).

Supplementary European Search Report dated Oct. 21, 2009, EP Application 07838403.

* cited by examiner

ANIONIC WETTING AGENTS FOR STABILIZING SELF-DEPOSITING COMPOSITIONS COMPRISING OXIDIC PIGMENTS

The present invention relates to an acidic aqueous particulate composition containing, in addition to iron(III) ions, fluoride ions and at least one water-insoluble, dispersed organic binder, a water-insoluble, dispersed oxide pigment with elevated resistance to agglomeration for the autophoretic deposition of organic-inorganic hybrid layers onto metal surfaces, the composition additionally containing at least one anionic wetting agent which comprises functional groups selected from sulfonates, phosphonates and/or carboxylates. The invention furthermore comprises the use of such a composition for the autodeposition of a film-forming organic-inorganic hybrid coating onto metal surfaces which are at least in part selected from surfaces, the main constituents of which are iron, zinc and/or aluminum.

Autodeposition compositions, which are also known technically as autophoretic baths, serve to provide an organic coating on metallic surfaces, usually ferrous surfaces, as an anticorrosion primer coat for metallic components or as an adhesive interlayer in the production of metal/elastomer joints, for example for vibration-damping components in the automotive industry. Autophoretic coating is thus a kind of dipcoating, which in contrast with electro-dipcoating, proceeds electrolessly, i.e. without the application of an external voltage source. Autodeposition compositions are usually aqueous dispersions of organic resins or polymers which, on coming into contact with the metallic surface, coagulate in a thin liquid layer directly on the surface of the component due to surface removal of metal cations by pickling and so result in layer build up. Layer build up is self-limiting, since coverage of the metal surface with the coagulated resin and/or polymer particles leads to a reduction in metal dissolution, so slowing and ultimately stopping the coagulation process.

Implementing autophoretic deposition industrially entails constant monitoring of bath composition. First of all, the deposition bath must be adjusted such that autodeposition proceeds sufficiently rapidly and uniformly on contact with the metallic component, it being essential to maintain the stability of the dispersion within the dip bath on an ongoing basis. It is additionally important not to allow the concentration of the cations, which are absorbed by the dip bath during the deposition process, to rise above a threshold value which is specific to the bath, since the overall aqueous dispersion otherwise becomes unstable and coagulates. Since autophoretic deposition is in particular suitable for forming organic film coatings with an anticorrosion action on metallic surfaces of iron, steel, zinc and aluminum, the input of polyvalent cations of zinc, iron and aluminum jeopardizes the stability of the dispersed particulate components. In particular for zinc cations, which are hardly complexed by the fluorides present in the bath composition, the maximum tolerable concentration in autodeposition baths conventionally lies at a particularly low level.

The prior art discloses both surfactant-stabilized dispersions and polymer-stabilized dispersions, which are suitable for providing an autodeposition composition.

U.S. Pat. No. 7,037,385 discloses aqueous dispersions of an ionically modified phenolic resin which may be made suitable for autodeposition by addition of an acid, preferably phosphoric acid. The ionically modified phenolic resins disclosed therein are self-dispersible. In addition to providing anticorrosion protection, such compositions are also intended to impart elevated breaking strength to coating. According to the teaching of U.S. Pat. No. 7,037,385, mechanical film properties may be controlled by the addition of flexibilizing components based on polymeric compounds, for example poly(acrylonitrile-butadiene) or polyacrylates.

U.S. Pat. No. 7,138,444, in contrast, discloses compositions containing a dispersion of an epoxy resin which is obtained from emulsion polymerization of ethylenically unsaturated compounds in the presence of an epoxy precursor. Dispersion is achieved using mechanical methods with the assistance of surface-active compounds, preferably anionically modified nonylphenol ethoxylates. Additional components are a curing agent based on blocked isocyanates, together with leveling and coagulation auxiliaries for thermal film formation of the autodeposited finish. U.S. Pat. No. 7,138,444 moreover discloses that the solids content of the dispersion may be reduced by adding "accelerators" consisting of fluoride ions and trivalent iron ions to a dispersion of the epoxy resin.

Further additives typically present in coatings are conventionally added to the autophoretic baths in order to impart specific physical properties to the cured autodeposited organic coating. Adding white pigments and/or carbon black is one typical measure for providing an optically opaque color of the organic autodeposited coating on the metal surface, for example for vehicle bodies or small semi-finished products in automotive manufacture. Moreover, the automotive industry in particular specifies in relation to precoating metal surfaces that the precoat not only laminates the metallic substrate but also additionally permits the application of color-imparting topcoats. However, the only precoats suitable for this purpose are those which reflect the majority of light in the visible range and therefore likewise contain a correspondingly high proportion of white pigment. However, adding white pigments known to a person skilled in the art of coating manufacture, for example oxides of the metals titanium or zinc, to an autophoretic composition does not in the main give rise to stable particulate compositions due to the different nature of the stabilization of the inorganic pigments and of the dispersed main binder. For instance, specific dispersions of inorganic pigments based on oxides exhibit rapid agglomeration in the presence of polyvalent metal cations and may thus be stabilized only with difficulty in autodeposition compositions with an elevated proportion of iron(III) ions. In the prior art, inorganic pigments are stabilized with specific polymeric dispersants which may be of an ionic and nonionic nature. The specific dispersants for inorganic pigments are, however, in the main of a different chemical nature than those compounds which are used for stabilization of the colloidal components of the binder and for use thereof in autodeposition compositions. A need accordingly still remains in the prior art for extremely stable particulate compositions for autophoretic applications, which, in addition to the organic main binder, contain dispersed components which are of an inorganic nature and/or are present in dispersed form as solid particles with a different particle size distribution or surface charge than the colloidal organic binder.

The object of the present invention is accordingly to bring about a distinct increase in the stability of acidic aqueous autodeposition compositions containing a dispersed organic binder system and a dispersed oxide pigment for dip or spray application and the maintenance of bath performance within a predetermined bath service life.

The object is achieved by means of an aqueous particulate composition suitable for autodeposition onto metallic surfaces which has a pH value of less than 4 and contains
a) iron(III) ions,
b) fluoride ions in a proportion such that the molar ratio of fluoride ions to iron(III) ions from water-soluble compounds amounts to at least 2:1, preferably at least 3:1 and is preferably no greater than 6:1,
c) a water-insoluble, dispersed organic binder (B),
d) an anionic surfactant which stabilizes the dispersed organic binder (B), and
e) at least one water-insoluble, dispersed oxide pigment (P), in which the composition additionally contains at least one anionic wetting agent which comprises functional groups selected from sulfonates, phosphonates and/or carboxylates.

Organic binders (B) satisfy the requirement of being thermally crosslinkable. Such binders (B) therefore consist of organic oligomeric or polymeric compounds with at least two functional groups and are accordingly capable of reacting with one another in condensation or addition reactions to form covalent bonds and, in so doing, of creating a network of covalently linked oligomeric or polymeric compounds. Binders (B) may consist either of a self-crosslinking oligomeric or polymeric compound with two identical or different functional groups capable of reacting with one another or of at least two different oligomeric or polymeric compounds which crosslink with one another as a result of their functionalization. A person skilled in the art also refers to the latter stated variant as a single-component system consisting of the resin to be crosslinked and the crosslinking agent or curing agent.

According to the invention, anionic surfactants have an amphiphilic molecular structure and are low molecular weight, non-polymeric compounds with a molar weight of no more than 1000 g/mol. The amphiphilic nature of the anionic surfactants in a composition according to the invention is the result, on the one hand, of the ionic group or group which at least in part dissociates ionically in water and, on the other hand, of another largely nonpolar molecular moiety.

According to the invention, anionic wetting agents are polyelectrolytes which are synthesized from monomers with ionic groups or groups which at least in part dissociate ionically in water, the ionic or ionically dissociating groups overall bearing a negative charge in the dissociated state. Copolymers of these monomeric anionic wetting agents are in principle also suitable for the purposes of the present invention. Examples of such anionic wetting agents are polyelectrolytes prepared from monomers with an acid functionality, such as acrylic acid, vinylphosphonic acid or styrenesulfonic acid. Wetting agents according to the invention are furthermore polymeric compounds with a molar weight of more than 1000 g/mol.

It has been found that anionic wetting agents which are suitable for stabilizing the autodeposition dispersion are in particular those which have a molar weight of at least 2000 g/mol, particularly preferably of at least 10000 g/mol, but does not exceed 200000 g/mol. At an identical proportion of wetting agent, higher molar weights of the polyelectrolytes in particular tend to result in destabilization of the dispersion and thus in flocculation of the organic and inorganic solid constituents of the autodeposition compositions. Excessively low molar weights, on the other hand, at an identical proportion of wetting agent, provide only inadequate steric stabilization of the dispersed particles, such that no significant improvement of the stability of the autodeposition dispersion is achieved.

In a composition according to the invention, the anionic wetting agent preferably has a charge equivalent per unit mass of at least 150 C/g, particularly preferably of at least 250 C/g. This approximately corresponds to 1.5 mmol or 2.5 mmol of anionic groups with a single charge per gram of the wetting agent. The elevated charge density in the polymeric wetting agent is, on the one hand, necessary for good water solubility and, on the other hand, advantageous for adsorption of the wetting agent onto the dispersed oxide pigments at the acidic pH value of the composition according to the invention. Adsorption of the wetting agent onto the dispersed components of the composition makes a substantial contribution to the stabilization of the individual particles. An elevated charge density in the polymeric wetting agent additionally ensures that a preferably extended conformation of the polymeric chain may be achieved in aqueous solution, which is in turn advantageous for steric stabilization of the dispersed solid particles in the composition according to the invention. Charge densities per unit mass of above 500 C/g are only achieved by specific polyelectrolytes, for example those which are synthesized from monomers with acid functionalities, the $pK_a$ value of which is below 2. In principle, preferred anionic wetting agents are those which are polyelectrolytes consisting of monomers with acid functionality, in which the $pK_a$ value of these monomers with acid functionality is below 4, particularly preferably below 3.

Suitable anionic wetting agents for stabilizing the composition according to the invention are in particular condensation products of naphthalenemono- and/or disulfonic acid or the derivatives thereof with formaldehyde and polymers and/or copolymers of styrenesulfonic acid.

The anionic wetting agent is here preferably selected from one or more compounds of the general structural formula (I):

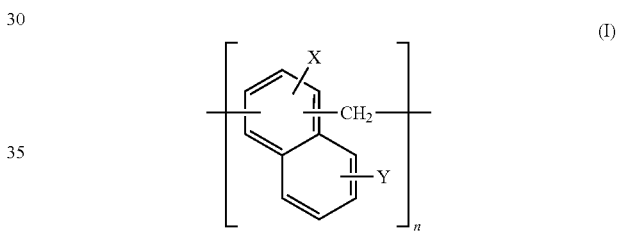

the residues X and Y being mutually independently selected from hydrogen, sulfonic acid groups and/or alkyl, oxoalkyl, hydroxyalkyl groups with in each case no more than 12 carbon atoms, particularly preferably no more than 6 carbon atoms, at least one residue X or Y representing a sulfonic acid group; n being a natural integer and the molar weight being greater than 1000 g/mol, particularly preferably greater than 2000, but no greater than 200,000 g/mol.

Alternatively or additionally, anionic wetting agents are preferably selected from one or more compounds of the general structural formula (II):

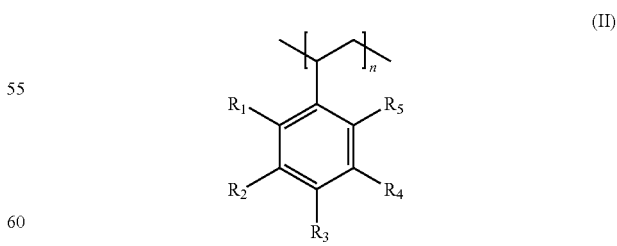

the residues $R_1$ to $R_5$ being mutually independently selected from hydrogen, alkyl groups with no more than 12 carbon atoms, particularly preferably no more than 6 carbon atoms, and sulfonic acid groups, the number of sulfonic acid groups in the compound of the structural formula (II) being at least n/2; n being a natural integer and the molar weight being greater than 1000 g/mol, particularly preferably greater than 2000, but no greater than 200,000 g/mol.

The total proportion of iron(III) ions dissolved in the composition according to the invention preferably amounts at least 0.02 wt. % relative to the element iron. If the quantity of iron(III) ions is distinctly below the preferred minimum quantity, the oxidation potential of the composition according to the invention is very slight, resulting in retarded deposition kinetics for dispersed, particulate components. Modifying or inhibiting autodeposition may, however, bring about the formation of non-homogeneous coatings and therefore tends to be disadvantageous. Excessively high concentrations of iron (III) ions may result in the metal surfaces to be treated being severely attacked, so resulting in elevated surface roughness. In addition, at relatively identical proportions of masking fluoride ions, the composition also tends to become susceptible to precipitation of iron(III) salts and coagulation of particle content.

In order to maintain or further increase oxidation potential, the aqueous composition may additionally contain an oxidizing agent, preferably hydrogen peroxide. The addition of hydrogen peroxide is in particular of significance in the treatment of ferrous surfaces for converting iron(II) to iron(III) ions, since iron(II) ions reduce the stability of the particulate dispersed components in fluoride-containing compositions more severely than do the corresponding iron(III) ions.

In a preferred autodeposition composition according to the invention with elevated stability with regard to sedimentation, the total solids content is no greater than 25 wt. %,
(i) 0.02 to 3 wt. % of Fe(III) ions,
(ii) 1 to 20 wt. % of dispersed organic binder,
(iii) 0.1 to 5 wt. % of dispersed oxide pigment and
(iv) 0.01 to 3 wt. % of wetting agent being present.

Preferred compositions according to the invention are in principle those in which the ratio per unit mass of wetting agent to dispersed organic binder and dispersed oxide pigment amounts to at least 0.04, particularly preferably at least 0.06, but is no greater than 0.2. A ratio per unit mass of distinctly more than 0.2 in the autodeposition composition does not result in any additional increase in stability of the dispersion, such that introduction of such a large quantity of the anionic wetting agent is not economically justified.

The oxide pigments used in the composition according to the invention preferably exhibit per se a positive surface charge at the respective prevailing acidic pH value. The oxide pigments here preferably contain at least one element which is selected from Al, Ca, Sr, Si, Ti, Zr, Fe, Sn, Ta, Nb and/or Ce. Examples of such pigments are $Al_2O_3$, CaO, $CaTiO_3$, $SrTiO_3$, $SiO_2$, $TiO_2$, $ZrO_2$, $Fe_2O_3$, $Fe_3O_4$, $SnO_2$, $Ta_2O_5$, $Nb_2O_5$, $Ce_2O_3$, $CeO_2$.

The dispersed organic binder used in the composition according to the invention is preferably a copolymer and/or polymer blend of acrylates with at least one oligomeric and/or polymeric compound selected from epoxy resins, phenolic resins and/or polyurethane resins.

As a crosslinked coating on a metal surface, water-dispersible epoxy resins have a particularly good barrier action against corrosive media and are therefore a preferred component of the dispersed binder (B) of the autodeposition compositions according to the invention. In addition to the epoxy resin, crosslinking curing agents, preferably at least partially based on phenolic resins, may optionally be used in order to accelerate the curing process and to increase the degree of crosslinking. Further curing agents which crosslink the epoxy resin agent are those based on isocyanate resins, the isocyanate groups of which may also be present in blocked form.

Preferred blocked isocyanate resins are moderately reactive isocyanates, for example aliphatic isocyanates and sterically hindered and/or acid-stably blocked isocyanates.

The epoxy resin which may be used for the composition according to the invention comprises incompletely crosslinked, oligomeric or polymeric compounds with free, for example terminally attached, epoxy groups, the preferred molecular weight of which is no less than 500 u and no greater than 5000 u. Examples of epoxy resins according to the invention are those based on bisphenol A and bisphenol F, together with epoxy-phenol novolaks.

For reasons of economic viability and commercial availability, epoxy resins based on bisphenol A which correspond to the general structural formula (III) below are preferably used for the purposes of the present invention:

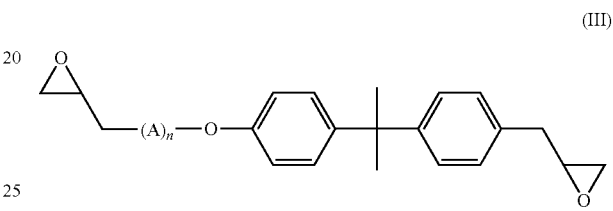

(III)

The structural unit A here corresponds to the following general formula (IV):

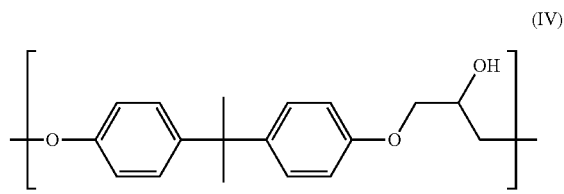

(IV)

with n being an integer from 1 to 50.

Preferred epoxies have an epoxy-equivalent weight (EEW) of no less than 100 g/eq, but no more than 5000 g/eq. The EEW here indicates the average molar weight per mol of epoxy functionality in the epoxy resin in grams per mol equivalent (g/eq). Particularly preferred epoxy-equivalent weight ranges here apply to specific epoxy resins:

| | |
|---|---|
| Brominated epoxy resins | 300-1000 g/eq, in particular 350-600 |
| Polyalkylene glycol epoxy resins | 100-700 g/eq, in particular 250-400 |
| Liquid epoxy resins | 150-250 g/eq |
| Solid/pasty epoxy resins | 400-5000 g/eq, in particular 600-1000 |

Phenolic resins which may be used for the composition according to the invention are incompletely crosslinked, oligomeric or polymeric polycondensation products of formaldehydes with phenols which preferably comprise at least partially etherified hydroxyl groups and the preferred average molecular mass of which is no less than 500 u and no greater than 10000 u. The hydroxyl groups are here preferably present in methoxylated, ethoxylated, propoxylated, butoxylated or ethenyloxylated form. Both resols and novolaks may be used as types of phenolic resin.

The anionic surfactant primarily present to stabilize the dispersed organic binder content (B) in the composition according to the invention preferably comprises sulfate, sulfonate, sulfosuccinate, phosphate or phosphonate groups and is in particular selected from alkylbenzene sulfonates, alkane sulfonates, methyl ester sulfonates, α-olefin sulfonates, alkyl sulfates and alkyl ether sulfates and from the analogous phosphonates and phosphates and/or from dialkyl sulfosuccinates of the following general structural formula (V):

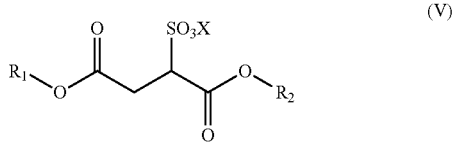

$R_1$ and $R_2$ being in each case mutually independently selected from branched or unbranched aliphatic residues with at least 2 C atoms, in particular with at least 8 C atoms, but no more than 30 C atoms, in particular no more than 20 C atoms and the residue X being a hydrogen atom or alkali metal atom.

In order, on the one hand, to ensure sufficient stability of the autodeposition compositions according to the invention and, on the other hand, to achieve sufficiently effective coalescence of the dispersed binder particles on the metal surface, preferred compositions are those in which the D90 value of the dispersed solid particles is below 10 µm. A D90 value indicates that 90 vol. % of the particles of the dispersion are smaller than the stated particle size. Such values may be determined from volume-weighted cumulative particle size distributions, which may be ascertained with the assistance of dynamic light scattering methods.

In addition, a composition according to the invention may contain further pigments which are not oxide pigments, in particular carbon black pigments.

Further optional components of the composition according to the invention are solvents, leveling agents, such as glycol ethers and alcohol esters, to enhance film formation of the deposited finish on the metallic surface, and defoamers, which are not anionic surfactants or polyelectrolytes and are preferably selected from nonionic surfactants.

The present invention furthermore comprises the use of a composition according to the invention for the autodeposition of a film-forming organic-inorganic hybrid coating onto metal surfaces which are at least in part selected from surfaces, the main constituents of which are iron, zinc and/or aluminum.

In a method according to the invention for coating metal surfaces, the metal surface which has been cleaned, degreased or from which organic contamination has been removed is brought into contact with an autodeposition composition according to the invention. Preferred metallic surfaces are here those which are selected from surfaces of iron, zinc and/or aluminum, and the respective alloys thereof. The composition is preferably brought into contact with the metallic surface or the metallic component by dipping or spraying, with dipping being particularly preferable due to the more uniform wetting of the surface.

In one current dipping method according to the invention, in which ferrous surfaces are treated, the redox potential may be used as an indicator of the ratio of iron(II) to iron(III) ions in the autodeposition compositions and be controlled by the addition of hydrogen peroxide, such that the longest possible bath stability may be ensured. The redox potential is the electrochemical equilibrium potential of a redox system measured on an inert metal electrode, for example platinum.

In a preferred embodiment, bringing the composition into contact with the metallic surface is followed, with or without an intermediate rinsing step, by a reaction rinse.

The purpose of such a reaction rinse is to provide additional anticorrosion protection for the metal surface coated by the method according to the invention, and thus corresponds to a passivating post-treatment of the uncrosslinked coating. The reaction rinse follows on directly from the treatment with an autodeposition composition, thus with or without an intermediate rinsing step, but in any event proceeds before the lacquer-like finish is cured. Such a reaction rinse effects an inorganic conversion of exposed metal surface at "microdefects", for example with the assistance of phosphate-containing solutions, which may additionally contain alkali metal and/or alkaline earth metal cations and also transition metal cations thereof, and the fluoro complexes thereof.

Film-formation of the coating or finish may proceed either immediately after the composition is brought into contact with the metallic surface, i.e. with or without an intermediate rinsing step, or the coating is not cured until after a reaction rinse has been carried out. The process of film-formation or curing of the gel-like coating is preferably carried out at temperatures of at least 90° C. and at most 250° C.

Metallic substrates coated in this method according to the invention are used in automotive construction, in architectural, construction and agricultural applications, and for the manufacture of tools, machinery and "white goods".

EXEMPLARY EMBODIMENTS

1a—Aqueous dispersion of binder (B) for production of an autodeposition composition:

Dispersions of the water-insoluble organic binder (B) are produced from an emulsion of the composition according to Table 1 discontinuously homogenized three times at 800 bar in an M-110 F Microfluidizer® (reaction chambers H 210Z and H 230Z, Microfluidics Corporation). The emulsions produced in this manner exhibit an average particle size of approx. 250 nm and a monomodal particle distribution. Particle size and particle distribution were determined by means of the Zetasizer® Nano S 90 (Malvern Instruments).

TABLE 1

Emulsion for producing an aqueous dispersion of the organic binder (B)

| Component | Chemical name | Proportion in wt. % |
|---|---|---|
| Epoxy resin | Epichlorohydrin/bisphenol A EEW: 860-930 g/eq $M_n$: approx. 2000 g/mol | 17.8 |
| Curing agent | Blocked isocyanate | 2.3 |
| Surfactant | Dodecylbenzene sulfonate, sodium salt | 0.5 |
| Wetting agent | Dehscofix ® 108: naphthalenemonosulfonic acid-formaldehyde condensation product (41 wt. %) | 0.2 |
| Polymer: | | 17.8 |
| monomers | Butyl acrylate | 5.3 |
| | Methacrylic acid | 0.3 |
| | Methyl methacrylate | 5.7 |
| | Hydroxyethyl methacrylate | 0.6 |
| | Styrene | 5.9 |
| Leveling agent | Trimethylpentane-1,3-diol monoisobutyrate | 1.5 |
| Water | Deionized water | 59.9 |

An initiator system (Table 2) is then added to this oil-in-water emulsion and free-radical emulsion polymerization of the unsaturated monomers is carried out at 60° C. After polymerization, a dispersion of the binder (B) according to component d) of the composition according to the invention is obtained with a particle content of approx. 37 wt. %.

TABLE 2

Initiator system for free-radical emulsion polymerization of emulsified and homogenized compositions P1 and P2 according to Table 1

| Component | Chemical name | Proportion in wt. %[1] |
|---|---|---|
| Reducing agent | Iron(II) sulfate | $2.3 \cdot 10^{-4}$ |
| Oxidizing agent[1] | Sodium formaldehyde sulfoxylate | 0.12 |
| | t-Butyl hydroperoxide | 0.17 |

[1]relative to the total composition according to Table 1

1b—Pigment paste of an oxide pigment (P) for producing an autodeposition composition:

A titanium dioxide paste containing water is produced by adding titanium dioxide powder to an appropriate quantity of water containing the anionic wetting agent and a solvent. After addition of a defoamer, the mixture is ground for approx. 60 minutes in a ball mill containing silicon carbide grinding beads with a diameter of 1.5 mm, the mass ratio of beads to millbase amounting to 3:2. The grinding operation is complete as soon as a grindometer value to DIN EN 21 524 of <10 μm is achieved. The composition of the pigment paste (P) containing titanium dioxide as white pigment is stated in Table 3.

TABLE 3

Pigment paste containing water of an oxide pigment (P)

| Component | Chemical name | Proportion in wt. % |
|---|---|---|
| Pigment (P) | Titanium dioxide | 70 |
| Wetting agent | Dehscofix ® 108: naphthalenemonosulfonic acid-formaldehyde condensation product (41 wt. %) | 6 |
| Solvent | Propylene glycol | 2 |
| Defoamer | 2,4,7,9-Tetramethyl-5-decyne-4,7-diol | 1.5 |
| Water | Deionized (<10 μS/cm) | 20.5 |

2—Production of an autodeposition composition using the binder dispersion (B) and the pigment paste (P):

An autodeposition composition according to the invention containing the white pigment titanium dioxide is produced by mixing the components from Table 4 with stirring and then making the mixture up to a volume of 1 l. The total particle content of the compositions according to the invention accordingly amounts to approx. 5 wt. %.

Even after a period of in excess of eight weeks, a homogeneous coating may be deposited onto a metal test sheet from a composition according to the invention according to Table 4 which is stirred with a rotational speed of more than 200 rpm. However, in an analogous composition according to Table 4, but which contains no anionic wetting agent (Dehscofix®, Huntsman Corp.), some of the dispersed solids content settle out on the vessel wall of the sample and, at the latest after one week, it is no longer possible to deposit a homogeneous coating from the composition.

TABLE 4

Autodeposition composition according to the invention containing dispersed organic binder system and particulate titanium dioxide

| Component | Chemical name | Proportion |
|---|---|---|
| Binder (B) | 37 wt. % dispersion[1] | 120 g |
| Pigment (P) | 70 wt. % $TiO_2$ paste[2] | 13 g |

TABLE 4-continued

Autodeposition composition according to the invention containing dispersed organic binder system and particulate titanium dioxide

| Component | Chemical name | Proportion |
|---|---|---|
| $H_2O_2$/iron(III) | ACC ® initiator 300 (Henkel) | 40 g |
| Fluoride | ACC ® activator (Henkel) | 10 g |
| Water | Deionized (<10 μS/cm) | 450 g |

[1]after emulsion polymerization of the composition of Table 1
[2]pigment paste according to Table 3

What is claimed is:

1. An aqueous, particulate composition for autodeposition onto metallic surfaces which has a pH value of less than 4 and contains:
  a) iron(III) ions;
  b) fluoride ions in a proportion such that the molar ratio of fluoride ions to iron(III) ions from water-soluble compounds amounts to at least 2:1;
  c) a water-insoluble, dispersed organic binder (B), wherein (B) is a blend comprising: a polymer, a copolymer or combinations thereof, wherein said polymer and copolymer are formed from acrylate monomers; and an oligomeric compound, a polymeric compound or combinations thereof, wherein said oligomeric and polymeric compounds are selected from epoxy resins, phenolic resins and/or polyurethane resins;
  d) an anionic surfactant which stabilizes the dispersed organic binder (B);
  e) at least one water-insoluble, dispersed oxide pigment (P); and
  f) at least one anionic wetting agent which is a polyelectrolyte and comprises functional groups selected from sulfonates, phosphonates, carboxylates and combinations thereof; wherein the at least one anionic wetting agent has a charge equivalent per unit mass of at least 150 C/g; and the at least one anionic wetting agent, the dispersed organic binder (B), and the at least one dispersed oxide pigment (P) are provided in amounts such that a ratio of the mass of the at least one anionic wetting agent to the combined mass of the dispersed organic binder (B) and the at least one dispersed oxide pigment (P) ranges from 0.04 to 0.2.

2. The composition according to claim 1, wherein the at least one anionic wetting agent has a molar weight of more than 2000 g/mol, but of no more than 200,000 g/mol.

3. The composition according to claim 2, wherein the water-insoluble, dispersed organic binder (B) comprises a blend comprising:
  a copolymer formed from acrylate monomers; and an oligomeric compound, a polymeric compound or combinations thereof, wherein said oligomeric and polymeric compounds are selected from epoxy resins; the anionic surfactant which stabilizes the dispersed organic binder (B) comprises ionic groups or groups which at least in part dissociate ionically in water and a non-polar molecular moiety; the at least one water-insoluble, dispersed oxide pigment (P) comprises Ti; and wherein the at least one anionic wetting agent comprises a polyelectrolyte formed from monomers consisting of monomers with acid functionality, in which pKa values of said monomers is below 4.

4. The composition according to claim 1, wherein the at least one anionic wetting agent comprises a condensation product of formaldehyde with at least one of naphthalenemonosulfonic acid, a derivative of naphthalenemonosulfonic acid, naphthalenedisulfonic acid, and a derivative of naphthalenedisulfonic acid.

5. The composition according to claim 1, wherein the at least one anionic wetting agent comprises one or more compounds of the general structural formula (I):

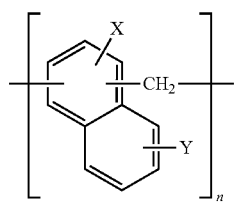

the residues "X" and "Y" being mutually independently selected from hydrogen, a sulfonate group, an alkyl group having no more than 6 carbon atoms, an oxoalkyl group having no more than 6 carbon atoms, and a hydroxyalkyl group having no more than 6 carbon atoms, wherein at least one residue "X" or "Y" is a sulfonate group;
"n" being a natural integer yielding a molar weight greater than 1000 g/mol, but no greater than 200,000 g/mol.

6. The composition according to claim 1, wherein the at least one anionic wetting agent comprises one or more compounds of the general structural formula (II):

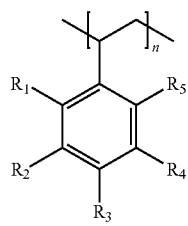

the residues $R_1$ to $R_5$ being mutually independently selected from hydrogen, an alkyl group with no more than 6 carbon atoms, and a sulfonate group, wherein the number of sulfonate groups in the compound of structural formula (II) is at least n/2; "n" being a natural integer yielding a molar weight greater than 1000 g/mol, but no greater than 200,000 g/mol.

7. The composition according to claim 1, wherein the total solids content of the composition is no greater than 25 wt. %, and comprising
0.02 to 3 wt. % of iron(III) ions,
1 to 20 wt. % of dispersed organic binder (B),
0.1 to 5 wt % of the at least one dispersed oxide pigment (P), and
0.01 to 3 wt. % of the at least one anionic wetting agent.

8. The composition according to claim 1, wherein the at least one anionic wetting agent, the dispersed organic binder (B), and the at least one dispersed oxide pigment (P) are provided in amounts such that a ratio of the mass of the at least one anionic wetting agent to the combined mass of the dispersed organic binder (B) and the at least one dispersed oxide pigment (P) ranges from 0.06 to 0.2.

9. The composition according to claim 1, wherein the at least one dispersed oxide pigment (P) comprises an oxide of at least one element selected from Al, Ca, Sr, Si, Ti, Zr, Fe, Sn, Ta, Nb and Ce.

10. The composition according to claim 1, wherein the dispersed organic binder (B) is a blend comprising: a polymer, a copolymer or combinations thereof, wherein said polymer and copolymer are formed from acrylate monomers; and an oligomeric compound, a polymeric compound or combinations thereof, wherein said oligomeric and polymeric compounds are selected from epoxy resins.

11. The composition according to claim 1, wherein the anionic surfactant which stabilizes the dispersed organic binder fraction (B) comprises sulfate, sulfonate, sulfosuccinate, phosphate or phosphonate groups.

12. The composition according to claim 11, wherein the anionic surfactant is selected from alkylbenzene sulfonates, alkane sulfonates, methyl ester sulfonates, α-olefin sulfonates, alkyl sulfates and alkyl ether sulfates and from the analogous phosphonates and phosphates.

13. The composition according to claim 11, wherein the anionic surfactant is selected from dialkyl sulfosuccinates of the following general structural formula (V):

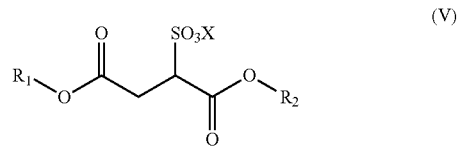

$R_1$ and $R_2$ being in each case mutually independently selected from branched or unbranched aliphatic residues with at least 2 C atoms, but no more than 30 C atoms, and the residue X being a hydrogen atom or alkali metal atom.

14. An aqueous, particulate composition for autodeposition onto metallic surfaces which has a pH value of less than 4 and contains:
a) iron(III) ions;
b) fluoride ions in a proportion such that the molar ratio of fluoride ions to iron(III) ions from water-soluble compounds amounts to at least 2:1;
c) a water-insoluble, dispersed organic binder (B), wherein (B) is a blend comprising: a polymer, a copolymer or combinations thereof, wherein said polymer and copolymer are formed from acrylate monomers; and an oligomeric compound, a polymeric compound or combinations thereof, wherein said oligomeric and polymeric compounds are selected from epoxy resins, phenolic resins and/or polyurethane resins exhibiting an average particle size of approximately 250 nm;
d) an anionic sulfonate surfactant which stabilizes the dispersed organic binder (B);
e) at least one water-insoluble, dispersed oxide pigment (P); and
f) at least one anionic wetting agent which is a polyelectrolyte comprising a condensation product of formaldehyde with at least one of naphthalenemonosulfonic acid, a derivative of naphthalenemonosulfonic acid, naphthalenedisulfonic acid, and a derivative of naphthalenedisulfonic acid, and having a molar weight of more than 2000 g/mol, but of no more than 200,000 g/mol;
wherein the at least one water-insoluble, dispersed oxide pigment (P) has the at least one anionic wetting agent adsorbed thereon.

15. The composition according to claim 14, wherein the at least one water-insoluble, dispersed oxide pigment (P) comprises titanium dioxide ground in the presence of f).

* * * * *